ated Dec. 2, 1969

United States Patent Office 3,481,973
Patented Dec. 2, 1969

3,481,973
PROCESSES FOR PREPARING ALKYL HYDROXYALKYL FUMARATES
James C. Wygant, Creve Coeur, and Howard L. Arons and Erhard J. Prill, St. Louis, Mo., assignors to Monsanto Chemical Company, St. Louis, Mo., a corporation of Delaware
No Drawing. Filed Oct. 24, 1963, Ser. No. 318,517
Int. Cl. C07c 63/46
U.S. Cl. 260—485                    13 Claims

ABSTRACT OF THE DISCLOSURE

Process for the organic base and organic nucleophile catalyzed reaction of alkylene oxides (such as ethylene oxide) with alkyl hydrogen fumarates (such as ethyl hydrogen fumarate) to produce alkyl hydroxyalkyl fumarates (such as ethyl 2-hydroxyethyl fumarate). Undesirable side reactions minimized by termination of reaction prior to stoichiometric completion with excess acid remaining. Reaction product can be copolymerized with vinyl chloride to form crosslinkable polymer.

---

This invention relates to processes for preparing alkyl hydroxyalkyl fumarates and especially concerns the catalyzed reaction of alkylene oxides with alkyl hydrogen fumarates.

Alkyl hydroxyalkyl fumarates are particularly desirable monomers and can be copolymerized with vinyl chloride or other unsaturated compounds which are polymerizable with fumaric diesters. The resulting copolymers have free hydroxyl groups which provide sites for crosslinking and similar reactions and find application as surface coatings.

Alkyl hydroxyalkyl fumarates are reported to be preparable by slowly adding the acid halide of an alkyl hydrogen fumarate to an excess of glycol or by reaction between an halohydrin and the silver salt of an alkyl hydrogen fumarate.

These methods are however unsuited for producing an inexpensive product in high yield having the purity required for subsequent use as a monomer. The prior art reactions are further undesirable as being at least 2-step processes requiring isolation of an acid chloride or a silver salt of the alkyl hydrogen fumarate as intermediates.

It is an object of the present invention to provide a process for preparing alkyl hydroxyalkyl fumarates in high yield which process is suitable for industrial use.

Another object of this invention is to provide a process for preparing alkyl hydroxyalkyl fumarates whereby the alkyl hydroxyalkyl fumarate so prepared has a low acid number.

Another object is to provide a single-step process for preparing alkyl hydroxyalkyl fumarates starting with alkyl hydrogen fumarates.

Another object is to provide a practical catalytic process for preparing alkyl hydroxyalkyl fumarates from alkyl hydrogen fumarates and alkylene oxides.

Another object is to provide catalysts for use in preparing alkyl hydroxyalkyl fumarates by the alkylene oxide reaction with alkyl hydrogen fumarates which catalysts can readily be removed from the reaction mixture.

Another object is to provide a process for reacting alkyl hydrogen fumarates and alkylene oxides to give a blend of products containing alkyl hydroxyalkyl fumarates as the predominate product.

Another object is to provide means to determine where to stop the reaction between alkyl hydrogen fumarate and alkylene oxide so as to obtain alkyl hydroxyalkyl fumarate of both high yield and purity.

The processes of the present invention can be represented by the equation:

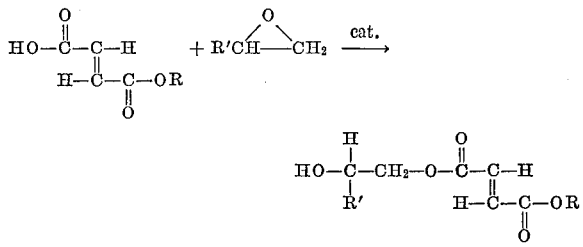

where R is a lower alkyl radical having no more than about 12 carbon atoms and preferably no mort than 6 carbons; and where R' is hydrogen or a lower alkyl radical having no more than about 6 carbon atoms (i.e., the 1,2-alkylene oxide has no more than about 8 carbon atoms) and preferably no more than about 2 carbons (i.e., the 1,2-alkylene oxide has no more than about 4 carbons).

R and R' may be straight-chained, branched, or cyclic.

Examples of R include methyl, ethyl, isopropyl, n-propyl, n-butyl, sec-butyl, n-amyl, n-hexyl, cyclohexyl, n-heptyl, n-octyl, isooctyl, 2-ethylhexyl, n-nonyl, n-decyl, n-undecyl, n-dodecyl, etc.

For use in the presently disclosed processes R preferably has about 6 or fewer carbon atoms. From a utility aspect particularly preferred are those compounds where R is methyl, ethyl, isopropyl, or n-butyl.

Examples of R' where R' is lower alkyl include methyl, ethyl, isopropyl, n-propyl, n-butyl, sec-butyl, n-amyl, n-hexyl, etc.

Preferably for use in this invention R' is hydrogen or methyl (i.e., the 1,2-alkylene oxide is ethylene oxide or propylene oxide).

The alkylene oxide reaction according to this invention is catalyzed with a nucleophilic catalyst selected from the group consisting of aromatic N-heterocyclic amines, tri-hydrocarbon substituted amines, di-N-hydrocarbon substituted amides, hydroxyalkyl amines, quaternary ammonium compounds, amine oxides, and tri-hydrocarbon substituted phosphines.

Examples of aromatic N-heterocyclic amines include pyridine and derivatives thereof, e.g., 2,6-lutidine, γ-picoline, 2-methyl-5-ethylpyridine, etc.; quinoline and derivatives thereof, e.g., lepidine, quinaldine, 2,3-dimethyl quinoline, etc.; isoquinoline and derivatives thereof; pyrimidine and its derivatives, etc.

Examples of tri-hydrocarbon substituted amines are triethylamine, N,N-dimethylaniline, triphenylamine, trimethylamine, N,N-methylethylaniline, etc.

Examples of di-N-hydrocarbon substituted amides are N,N'-di(t-butyl)thiourea, N,N-dimethylformamide, N,N-dimethylacetamide, N,N-diethylbenzamide, etc.

Examples of hydroxyalkyl amines are ethyldiethanolamine, triethanolamine, dimethylethanolamine, β-hydroxypropylmethylethylamine, etc. These are generally formed in situ from secondary and primary amines or from ammonia.

Examples of quaternary ammonium compounds are benzyltrimethylammonium chloride, tetramethylammonium chloride, tetramethylammonium hydroxide, bis(benzyltrimethylammonium) fumarate, etc.

Examples of amine oxides are pyridine N-oxide, trimethylamine N-oxide, triethylamine N-oxide, tripropylamine N-oxide, etc.

Examples of tri-hydrocarbon substituted phosphines are tributylphosphine, triphenyl phosphine, trimethylphosphine, triethylphosphine, etc.

Preferably about 2 to 5 equivalent percent of catalyst, based on the alkyl hydrogen fumarate, is used to accomplish the reaction of this invention. Higher amounts of catalyst such as 10 equivalent percent or more can be used, however, yields are generally lower than when no more than about 5 equivalent percent of catalyst has been introduced. On the other hand the reaction may be run where only 1 equivalent percent or less of catalyst is used by extending the reaction time.

Preferably the alkylene oxide reaction is carried out in the absence of a solvent—the alkyl hydrogen fumarate being simply melted and alkylene oxide introduced. However, where desired, a solvent for the alkyl hydrogen fumarate, e.g., aromatic hydrocarbons, ethers, alcohols, nitriles, etc., can be employed in whatever amount desired. Examples of solutions which have been found useful include 50 weight percent solutions of alkyl hydrogen fumarate in toluene, xylene, and t-butanol respectively.

Reaction temperature is generally maintained above the melting point of the alkyl hydrogen fumarate and below about 250° centigrade. However, where a reaction solvent is employed a lower temperature may be used. As a rule the most suitable temperature range is from about 75° to 150° centigrade.

The pressure at which the reaction is run is noncritical but commonly will be from about 1–2 atmospheres though much higher pressures can be employed.

Reaction is started by passing alkylene oxide or alkylene oxide contained in an inert diluent (e.g., nitrogen, methane, butane, etc.) into the reaction vessel.

The flow of alkylene oxide is continued and reaction is allowed to proceed until a product having the desired acid number is obtained. Careful control must be exercised to terminate the reaction at the proper time. For the processes of this invention the final acid number should be no lower than about 2 and it is desirable that the reaction be run until the final acid number is less than about 20 and preferably less than about 10.

If the alkylene oxide reaction is stopped when the mixture has a higher acid number there will be a large percentage of unconverted alkyl hydrogen fumarate. If the reaction is continued until the acid number drops to lower than about 2 a large amount of alkylene glycol bis (alkyl fumarate) begins to forms. The alkylene glycol bis (alkyl fumarate) renders the alkyl 2-hydroxyethyl fumarate unsuitable for subsequent use as a monomer because it causes undesirable crosslinking reactions. For this reason it is impractical to attempt to achieve complete conversion of the alkyl hydrogen fumarate to alkyl hydroxyalkyl fumarate.

The examples below are included merely to illustrate the invention and other embodiments and modifications will be obvious to those skilled in the art, e.g., the present reaction can be run by continuous as well as batch process, etc.

EXAMPLES

The processes of this invention are best illustrated by the reaction of ethylene oxide with ethyl hydrogen fumarate in presence of one of the catalysts herein disclosed.

Ethyl hydrogen fumarate and ethylene oxide react according to the conditions employed to produce essentially 3 major product types:

(A)

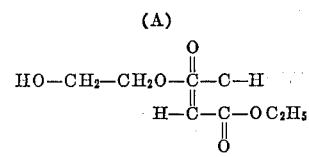

ethyl 2-hydroxyethyl fumarate.

(B)

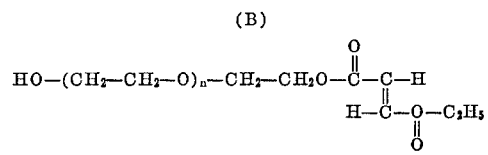

n-1, ethyl 2-(2'-hydroxyethoxy) ethyl fumarate.

(C)

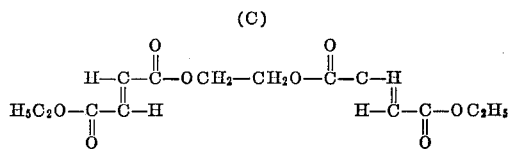

ethylene glycol bis(ethyl fumarate).

Structure A is the primary product of the reaction.

Structure B is the reaction product of the main product A with one or more additional molecules of ethylene oxide. Normally the higher homologues of structure B are produced in very small quantities and ethyl 2-(2'-hydroxyethoxy)ethyl fumarate is the only member of this product type present in significant amounts. This material (B) being a hydroxylated mono-fumarate, is useful in producing crosslinkable vinyl monomers and its presence in the product blend is not objectionable.

Structure C is produced by ester interchange reactions and being a hydroxylated bis-fumarate can lead to insoluble, crosslinked polymers. Its concentration must therefore be kept at a low level.

By the processes of the present invention it is possible to choose and control the reaction conditions to produce alkyl 2-hydroxyethyl fumarate (A) in high yield and with a minimum amount of ethylene glycol bis(alkyl fumarate), structure C, being formed.

Specific details for performing the present processes are given below:

(I)

Five g. of ethyl hydrogen fumarate and catalyst, in the amount shown in Table I, are placed in a 100 ml. round-bottom flask equipped with gas inlet and outlet, thermocouple well, and a magnetic stirrer. Where a solvent is employed, it is also introduced at this time. The system is flushed with nitrogen and the contents of the flask heated to the desired reaction temperature with rapid stirring. A steady stream of ethylene oxide is passed into the system via the gas inlet. The reaction is followed by withdrawing small aliquots (ca. 0.1 ml.) from time to time and titrating unreacted ethyl hydrogen fumarate with standard base solution. When the reaction has the desired acid number [1], reaction is terminated by flushing the system with nitrogen. Results are tabulated in Table 1.

methylacetamide, N,N - diethylbenzamide, pyridine N-oxide, trimethylamine N - oxide, triphenylphosphine, where the catalyst is used in an amount no greater than

TABLE 1

| Run | Catalyst | Amt. eq., percent | Solvent | Temp., °C. | Time, hrs. | Final Acid No. | Reaction Products, percent[1] | | |
|---|---|---|---|---|---|---|---|---|---|
| | | | | | | | A | B | C |
| 1 | Triethylamine | 10 | | 80 | 2 | 3 | 95 | 2.6 | 1.9 |
| 2 | 2,6-lutidine | 1 | | 80 | 2¼ | 2 | 84 | 10 | 4.4 |
| 3 | γ-Picoline | 1 | | 80 | 2 | 2 | 89 | 7.8 | 3.0 |
| 4 | N,N-dimethylaniline | 10 | t-Butanol, 50% | 80 | 4 | 2 | 93 | 1.3 | 0.8 |
| 5 | do | 1 | | 80 | 2½ | 2 | 90 | 7.0 | 3.0 |
| 6 | N,N'-di(t-butyl)thiourea | 1 | | 80 | 5 | 2 | 87 | 9.3 | 3.6 |
| 7 | do | 2 | | 80 | 4 | 2 | 85 | 6.6 | 8.1 |
| 8 | Tributylphosphine | 2 | Toluene, 50% | 80 | 3 | 2 | 84 | 2.2 | 14 |
| 9 | Triphenylphosphine | 10 | | 80 | 1 | 2 | 73 | 9.3 | 15 |
| 10 | do | 5 | Toluene, 50% | 80 | 2½ | 8 | 88 | 8.5 | 1.5 |
| 11 | do | 2 | Xylene, 50% | 120 | 1¾ | 4 | 95 | 2.8 | 1.2 |
| 12 | Pyridine N-oxide | 10 | do | 80 | 2 | 17 | 93 | 2.1 | 0.6 |
| 13 | do | 2.5 | do | 80 | 3 | 8 | 92 | 4.6 | 1.5 |
| 14 | Trimethylamine N-oxide | 5 | do | 80 | 2¼ | 2 | 97 | 1.7 | 1.3 |
| 15 | do | 2 | do | 80 | 3 | 15 | 86 | 7.1 | 2.9 |
| 16 | Dimethylformamide | 5 | | 80 | 3½ | 6 | 83 | 6.6 | 5.9 |
| 17 | do | 5 | t-Butanol, 50% | 80 | 4 | 18 | 76 | 6.1 | 2.4 |
| 18 | do | 4 | Xylene, 50% | 80 | 2½ | 12 | 86 | 7.0 | 4.1 |
| 19 | do | 4 | do | 110 | 2 | 5 | 82 | 4.0 | 11 |
| 20 | Bis(benzyltrimethylammonium)fumarate | 2 | do | 80 | 4 | 2 | 92 | 6.2 | 2.2 |
| 21 | Pyridine N-oxide, 20% (wt./wt.) on amorphous charcoal | 10 | do | 80 | 4¼ | 9 | 92 | 3.2 | 1.6 |
| 22 | Ethyldiethanol amine | 2 | | 100 | 5 | 12 | 91 | 5.5 | 3.5 |
| 23 [2] | Pyridine | 2 | | 80 | 3½ | 4 | 92 | 6.2 | 1.3 |

[1] The percentages shown represent ratios of the major reaction products as determined by calculation of area percentages obtained by gas chromatography.
[2] Propylene oxide was used instead of ethylene oxide.
Note.—A=ethyl 2-hydroxyethyl fumarate; B=Ethyl 2-(2'-hydroxyethoxy)ethyl fumarate; C=Ethylene glycol bis(ethyl fumarate).

(II)

To a reactor equipped with stirrer, thermometer, gas inlet adapter, sampling tube, and outlet connected to a mercury manometer and mounted on a balance is charged 576 g. (4 moles) ethyl hydrogen fumarate. Catalyst is added in the amounts shown in Table 2. When a solvent is used it is introduced at this time; otherwise the charge is heated to ca. 70° C., to melt the ethyl hydrogen fumarate. The reactor is flushed with nitrogen and heated to the desired reaction temperature. Ethylene oxide is fed into the vessel and the reaction is allowed to proceed until approximately theoretical weight increase is obtained. The reaction is stopped by discontinuing the flow of ethylene oxide when the acid number of the reaction mixture reaches the pre-designated range. Results are shown below.

about 10 equivalent percent based on the alkyl hydrogen fumarate and the reaction is stopped before the acid number is less than about 2.

2. The process of claim 1 where the catalyst is used in an amount equal to about 1 to 10 equivalent percent based on the alkyl hydrogen fumarate.

3. A process for preparing alkyl 2-hydroxyalkyl fumarates which comprises reacting an 1,2-alkylene oxide having no more than about 4 carbon atoms and an alkyl hydrogen fumarate which has no more than about 6 carbon atoms in its alkyl group in the presence of a catalyst selected from the group consisting of pyridine, 2,6-lutidine, 4 - picoline, triethylamine, N,N - dimethylaniline, N,N-dimethylformamide, N,N - dimethylacetamide, N,N-diethylbenzamide, pyridine N-oxide, trimethylamine N-

TABLE 2

| Run | Catalyst | Amt., eq. Percent | Solvent | Temp., °C. | Time, hrs. | Final Acid No. | Reaction Products, Percent | | |
|---|---|---|---|---|---|---|---|---|---|
| | | | | | | | A | B | C |
| 1 | Pyridine | 10 | t-Butanol, 50% | 80 | 4½ | 7 | 97.2 | 1.5 | 1.4 |
| 2 | Triethylamine | 5 | | 85 | 5 | 3 | 91.8 | 4.5 | 3.8 |
| 3 | do | 5 | | 100 | 1⅔ | 2 | 79.4 | 3.7 | 16.9 |
| 4 | do | 1 | | 100 | 3¼ | 15 | 83.3 | 11.5 | 5.1 |
| 5 | do | 1 | | 100 | 3¾ | 11 | 83.4 | 10.6 | 6.0 |
| 6 | Pyridine | 1 | | 80 | 3½ | 15 | 88.9 | 8.5 | 2.5 |
| 7 | do | 1 | | 70 | 5½ | 16 | 88.1 | 9.3 | 2.5 |
| 8 | do | 1 | t-Butanol, 10% | 80 | 3¾ | 14 | 91.6 | 6.6 | 1.8 |
| 9 | Triethylamine | 1 | | 80 | 6 | 18 | 83.9 | 12.4 | 3.8 |
| 10 | Triphenylphosphine | 2 | Xylene, 50% | 80 | 2 | 12 | 94.4 | 3.6 | 2.1 |
| 11 | Pyridine N-oxide | 10 | do | 80 | 1½ | 16 | 95.5 | 3.0 | 1.2 |
| 12 | Pyridine | 2 | | 80 | 2 | 12 | 91.2 | 6.3 | 2.4 |

A=ethyl 2-hydroxyethyl fumarate
B=ethyl 2-(2'-hydroxyethoxy)ethyl fumarate
C=ethylene glycol bis(ethyl fumarate)

What is claimed is:

1. A process for preparing alkyl 2-hydroxyalkyl fumarates which comprises reacting a 1,2-alkylene oxide containing no more than 8 carbon atoms and an alkyl hydrogen fumarate having no more than 12 carbon atoms in its alkyl group at a temperature of from 75 to 150° C. in the presence of a catalyst selected from the group consisting of pyridine, 2,6-lutidine, 4-picoline, triethylamine, N,N-dimethylaniline, N,N - dimethylformamide, N,N-dioxide, triphenyl phosphine, where the catalyst is used in an amount equal to about 1 to 10 equivalent percent based on the alkyl hydrogen fumarate, the reaction temperature is maintained at 75° to 150° centigrade, and where the reaction is stopped when the acid number is about 2 to 20.

4. The process of claim 3 where the alkylene oxide is ethylene oxide.

5. The process of claim 3 where about 2 to 5 equivalent percent of catalyst is used based on the alkyl hydrogen fumarate.

6. The process of claim 3 where the reaction is run until the acid number is about 2 to 10.

7. A process for preparing alkyl 2-hydroxyethyl fumarates which comprises reacting ethylene oxide and an

[1] Acid number is a number which indicates the amount of free acid present in a substance. It is expressed by the number of mg. of potassium hydroxide which are required to neutralize the acid in a gram of the substance. When the reaction is run with a solvent, the acid number as expressed has been corrected for the solvent in the sample.

alkyl hydrogen fumarate which has no more than about 6 carbon atoms in its alkyl group in the presence of a catalyst selected from the group consisting of pyridine, 2,6-lutidine, 4-picoline, triethylamine, N,N-dimethylaniline, N,N-dimethylformamide, N,N - dimethylacetamide, N,N-diethylbenzamide, pyridine N-oxide, trimethylamine N-oxide, triphenyl phosphine, where the catalyst is used in an amount equal to about 2 to 5 equivalent percent based on the alkyl hydrogen fumarate, the reaction temperature is maintained between about 75° to 150° centrigrade, and where the reaction is stopped when the acid number is about 2 to 10.

8. The process of claim 7 where ethyl 2-hydroxyethyl fumarate is prepared.

9. The process of claim 7 where the catalyst is pyridine.

10. The process of claim 7 where the catalyst is triethylamine.

11. The process of claim 7 where the catalyst is a dimethyl formamide.

12. The process of claim 7 where the catalyst is pyridine oxide.

13. The process of claim 7 where the catalyst is triphenylphosphine.

References Cited
UNITED STATES PATENTS

| | | | |
|---|---|---|---|
| 3,190,899 | 6/1965 | Walton et al. | 260—404.8 |
| 3,360,545 | 12/1967 | Wy Gant | 260—485 |
| 2,386,446 | 10/1945 | De Groote et al. | |
| 2,910,490 | 10/1959 | Malkemus. | |
| 3,270,088 | 8/1966 | Hicks | 260—485 |

LORRAINE A. WEINBERGER, Primary Examiner

E. J. SKELLY, Assistant Examiner

U.S. Cl. X.R.

260—78.5